United States Patent
Li et al.

(10) Patent No.: US 12,000,925 B2
(45) Date of Patent: Jun. 4, 2024

(54) TERRACE DETECTION DEVICE AND USE METHOD OF TERRACE DETECTION DEVICE

(71) Applicant: Suzhou Fangshi Technology Co., Ltd., Suzhou (CN)

(72) Inventors: Siqiao Li, Suzhou (CN); Wenlong Feng, Suzhou (CN); Xiao Zong, Suzhou (CN); Bo Liu, Suzhou (CN); Hao Zhou, Suzhou (CN); Jie Wang, Suzhou (CN); Wei Hu, Suzhou (CN)

(73) Assignee: SUZHOU FANGSHI TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 18/151,389

(22) Filed: Jan. 6, 2023

(65) Prior Publication Data
US 2023/0204758 A1 Jun. 29, 2023

Related U.S. Application Data

(63) Continuation of application No. PCT/CN2022/091859, filed on May 10, 2022.

(30) Foreign Application Priority Data

Dec. 27, 2021 (CN) .......................... 202111619719.X

(51) Int. Cl.
| | | |
|---|---|---|
| *G01S 13/89* | (2006.01) | |
| *B60R 11/04* | (2006.01) | |
| *F16L 55/28* | (2006.01) | |
| *F16L 101/30* | (2006.01) | |
| *G01M 3/00* | (2006.01) | |
| *G01N 29/22* | (2006.01) | |
| *G01N 29/265* | (2006.01) | |

(52) U.S. Cl.
CPC .............. *G01S 13/89* (2013.01); *B60R 11/04* (2013.01); *F16L 55/28* (2013.01); *G01M 3/005* (2013.01);
(Continued)

(58) Field of Classification Search
CPC ........ G01S 13/89; B60R 11/04; G01M 3/005; G01N 29/265; G01N 29/225; F16L 2101/30; F16L 55/28
(Continued)

(56) References Cited

U.S. PATENT DOCUMENTS

2007/0100496 A1* 5/2007 Forell ................... G05D 1/024
701/23
2012/0078451 A1* 3/2012 Ohtomo ............... G05D 1/0669
701/15
(Continued)

FOREIGN PATENT DOCUMENTS

CN 102155923 A * 8/2011
CN 102155940 A * 8/2011
(Continued)

OTHER PUBLICATIONS

Takehiro Tsuruta et al., Mobile robot for marking free access floors at construction sites, Automation in Construction, 2019, 11 pg(s) (Year: 2019).*
(Continued)

*Primary Examiner* — Stephanie E Bloss
*Assistant Examiner* — Kevin C Butler
(74) *Attorney, Agent, or Firm* — Getech Law LLC; Jun Ye

(57) ABSTRACT

The present invention provides a terrace detection device and a use method of the terrace detection device. The terrace detection device comprises a target vehicle, a measuring vehicle and a controller, wherein the target vehicle comprises a first mobile vehicle and a target, and the target is mounted on the first mobile vehicle; the measuring vehicle comprises a second mobile vehicle and a measuring head, and the measuring head is mounted on the second mobile vehicle; and The controller is electrically connected with the
(Continued)

measuring vehicle and the target vehicle, respectively, and is used for controlling the first mobile vehicle and the second mobile vehicle to move from a first established measuring range to a second established measuring range. Therefore, the to-be-measured terrace is estimated integrally, so that the accuracy of the acquired terrace data is improved.

10 Claims, 4 Drawing Sheets

(52) U.S. Cl.
CPC ......... *G01N 29/225* (2013.01); *G01N 29/265* (2013.01); *F16L 2101/30* (2013.01)

(58) Field of Classification Search
USPC ....................................... 73/865.8
See application file for complete search history.

(56) References Cited

U.S. PATENT DOCUMENTS

2013/0310971 A1* 11/2013 Prouty .................. E01C 23/163
901/1

2018/0202805 A1* 7/2018 Unger .................... G01S 7/4813
2020/0037498 A1* 2/2020 Ko ........................ G05D 1/0274
2022/0414925 A1* 12/2022 Parian ..................... G01S 17/42

FOREIGN PATENT DOCUMENTS

| | | | | |
|---|---|---|---|---|
| CN | 108801142 A | * | 11/2018 | ........... G01B 11/002 |
| CN | 111238379 A | * | 6/2020 | |
| CN | 111307041 A | * | 6/2020 | |
| CN | 114001680 A | * | 2/2022 | |
| CN | 114234862 A | * | 3/2022 | |
| CN | 114322899 A | * | 4/2022 | |
| WO | WO-2021212844 A1 | * | 10/2021 | |

OTHER PUBLICATIONS

Kim et al., Slam-driven robotic mapping and registration of 3D point clouds, Automation in Construction 89 (2018) 38-48 (Year: 2018).*
Ying Li et al, Deep Learning for LiDAR Point Clouds in Autonomous Driving: A Review, IEEE, May 20, 2020, pp. 1-21 (Year: 2020).*
Bilawal Mahmood et al, BIM-Based Registration and Localization of 3D Point Clouds of Indoor Scenes Using Geometric Features for Augmented Reality, MDPI Remote Sens. 2020, 12, 2302; doi: 10.3390/rs12142302 (Year: 2020).*

* cited by examiner

TERRACE DETECTION DEVICE AND USE METHOD OF TERRACE DETECTION DEVICE

CROSS REFERENCE TO RELATED APPLICATIONS

This application is a continuation of application PCT/CN2022/091859, filed May 10, 2022, which claims priority to Chinese Application No. 202111619719.X, filed Dec. 27, 2021. The contents of each of the above-captioned patent applications are hereby expressly incorporated herein by reference in their entireties.

TECHNICAL FIELD

The present invention relates to the technical field of terrace detection, particular to a terrace detection device and a use method of the terrace detection device.

BACKGROUND

Terrace is a necessary component for all building engineering, and its surface quality directly affects use functions and subsequent construction of upper structures. The surface quality of the terrace mainly includes two indexes: levelness and flatness. Levelness is used to represent a macroscopic slope of the terrace and flatness is used to represent a degree that a local part of the terrace deviates from an ideal plane. At present, a universal standard for the terrace quality at home and abroad is relevant regulations in Acceptance Specification on Construction Quality of Building Ground Engineering, GB50209-2010. Taking a concrete ground as an example, a criterion of acceptability on flatness 2 m, with the maximum deviation of a guiding rule not exceeding 5 mm. Levelness measurement is only dependent on visual observation and leveling instrument measurement or measuring methods such as a water sprinkling method that is rough. The detection method features simple operation and cheap price and easy use of tools, and is suitable for grounds of residences and commercial buildings and the like. For terraces with large areas of warehouses, plants, runways, squares and the like and with high requirement on surface quality, even though the terraces are detected acceptable according to the standard, they cannot meet their functional requirements.

At present, there is a prevailing numerical method applicable for a high precision terrace with a detection standard of F, which is first an industrial standard of American Concrete Institute (ACO) and is widely acceptable by various countries step by step, becoming a recommended standard (ASTME1155M and the like) of some countries. A fundamental principle of the detection method includes: extracting several straight lines according to a certain rule on a measured terrace; measuring an elevation of a point on each of the straight lines continuously by using a high precision measuring device; calculating numerical values representing levelness and flatness of each of the straight lines; and then integrating calculating results of all the straight lines into measuring results Ff (flatness) and Fl (levelness) of the whole terrace by employing a statistical method.

A common measuring tool for the F numerical value is Dipstick manufactured by American Face corporation. Dipstick is internally provided with a tilt angle sensor, two supporting feet at the lower end and a handle on the upper portion. As shown in FIG. 1, during measurement, the two supporting feet are first placed at starting points of the measured straight line, and the user holds the tail end of the handle to keep one of the supporting feet immobile and lift up the other supporting foot, so that the device rotates at 180° around the fixed supporting foot, the other supporting foot falls on the straight line front, and so forth, and therefore, it goes through the whole straight line. In the process, the tilt angle sensor records a horizontal angle of the device stopping stably every time. As the distance between the two supporting feet is unchanged, the relative height difference between the front and back supporting feet stopping stably every time according to the angle. The Ff (flatness) numerical value of the straight line can be calculated according to a height difference of each section, and the Fl (levelness) of the straight line can be calculated according to height differences of several continuous sections.

For other flatness measuring devices, a datum plane is usually constructed by using a large-span steel beam, and a distance sensor is mounted in the middle of the steel beam. During detection, the device moves along a path direction to record fluctuation of ground height measured by the distance sensor, and it can represent a flatness attribute of the local terrace after calculation by the statistical method. Furthermore, the distance sensor is mounted on a mobile chassis of an automobile with a similar measuring theory.

The above-mentioned terrace measuring standards and means have the following defects:

1. Detection of the terrace quality by means of the guiding rule is extremely affected by a sampling position and subjective factors of personnel, the detection result can hardly be reproduced. By taking the result as the acceptance standard, it is only suitable for small area terraces without special requirements such as blank residences.

2. Although the related method of F numerical value can represent the surface quality of the terrace more accurately compared with existing national standard based on the guiding rule, essentially, the method still infers some attributes of high-dimensional (two-dimensional plane and three-dimensional curved surfaces) substances by means of low-dimensional (one-dimensional and linear) information. Whether the terrace is qualified or not can be judged according to the measuring result, but the true form of the terrace surface cannot be observed directly. It is also difficult to perform repair at a fixed point according to the measuring result, and it most often relies on the water sprinkling method to judge the repair area.

3. Similar measuring devices such as Dipstick are accepted and applied in many fields. They feature pure manual operations, low measuring speed and large manual consumption, so that the cost is high.

SUMMARY

The present invention is mainly intended to provide a terrace detection device and a use method of the terrace detection device so as to solve the technical problem that the terrace detection efficiency is low and the terrace is inaccurately detected in the prior art.

In order to achieve the above-mentioned objective, according to one aspect of the present invention, provided is a terrace detection device, including a target vehicle, the target vehicle including: a first mobile vehicle; a target mounted on the first mobile vehicle; a measuring vehicle, the measuring vehicle including: a second mobile vehicle; a measuring head mounted on the second mobile vehicle, the measuring head being used for acquiring planar point cloud data and target graphic information in an established measuring range; and a controller electrically connected with the measuring vehicle and the target vehicle respectively, and used for controlling the first mobile vehicle and the second mobile vehicle to move from a first established measuring range to a second established measuring range, wherein the controller further controls the measuring head to acquire first point cloud data in the first established measuring range and second point cloud data in the second established measuring range as well as first target graphic information in the first established measuring range and second target graphic information in the second established measuring range, and the controller splices the first point cloud data and the second point cloud data together according to the first target graphic information and the second target graphic information.

In an implementation mode, the measuring vehicle further includes a bracket, the bracket is mounted on the second mobile vehicle, and the measuring head is mounted on the bracket.

In an implementation mode, the bracket includes a vertical frame and a transverse frame, the vertical frame is vertically mounted on the second mobile vehicle, the transverse frame is transversely disposed on the vertical frame, and the measuring head is mounted on the transverse frame.

In an implementation mode, the second mobile vehicle includes: a second vehicle body; driving wheels mounted on both sides of the second vehicle body and used for driving the second vehicle body to move; and a supporting wheel mounted on a front side and/or a rear side of the second vehicle body and used for supporting the second vehicle body.

In an implementation mode, the target is a geometrical identification member or a non-geometrical identification member mounted on the first mobile vehicle.

In order to achieve the above-mentioned objective, according to one aspect of the present invention, provided is a use method of a terrace detection device. The use method is used for controlling the terrace detection device. The use method includes: S10: controlling a first mobile vehicle to move to a first position in a first established measuring range; S20: controlling a second mobile vehicle to move to a position of the first established measuring range and controlling a measuring head to acquire first point cloud data of the first established measuring range, and acquiring first target graphic information of a target in the first established measuring range by combining the first point cloud data; S30: controlling the second mobile vehicle to move to a position of the second established measuring range and controlling the measuring head to acquire second point cloud data of the second established measuring range, and acquiring second target graphic information of the target in the second established measuring range by combining the second point cloud data; and S40: splicing the first point cloud data and the second point cloud data together according to the first target graphic information and the second target graphic information.

In an implementation mode, in S40, the first point cloud data and the second point cloud data are spliced together by superposing the first target graphic information and the second target graphic information.

In an implementation mode, the first target graphic information is first boundary position information of the first established measuring range, and the second target graphic information is second boundary position information of the second established measuring range.

In an implementation mode, the use method further includes: S50: controlling the first mobile vehicle to move to the second position in the second established measuring range; S60: controlling the measuring head to acquire third target graphic information of the target in the second established measuring range by combining the second point cloud data; S70: controlling the second mobile vehicle to move to a position of the third established measuring range and controlling the measuring head to acquire third point cloud data of the third established measuring range, and acquiring fourth target graphic information of the target in the third established measuring range by combining the third point cloud data; and S80: splicing the second point cloud data and the third point cloud data together according to the third target graphic information and the fourth target graphic information.

In an implementation mode, in S80, the second point cloud data and the third point cloud data are spliced together by superposing the third target graphic information and the fourth target graphic information.

By applying a technical solution of the present invention, point cloud data that can only be acquired by the measuring vehicle can be spliced together by the cooperation of the target vehicle and the measuring vehicle, so that comprehensive data of a to-be-measured terrace is obtained. Therefore, the to-be-measured terrace is estimated integrally, so that the accuracy of the acquired terrace data is improved. Meanwhile, the terrace detection efficiency can further be improved by the cooperation of the target vehicle and the measuring vehicle.

Besides the above-mentioned objectives, characteristics and advantages, the present invention further has other objectives, characteristics and advantages. Further detailed description of the present invention will be made below with reference to drawings.

BRIEF DESCRIPTION OF DRAWINGS

The drawings of the description constituting a part of the present invention are to provide further understanding of the present invention. The schematic embodiment and description thereof are used for explaining the present invention and do not limit the present invention improperly. In the drawings.

DETAILED DESCRIPTION OF EMBODIMENTS

It should be noted that in the absence of conflict, the embodiments of the present invention and features in the embodiments can be combined with one another. Detail description on the present invention will be made below in combination with the drawings and the embodiments.

In order to make those skilled in the art better understand the schemes of the present invention, clear and intact description will be made on the technical schemes in the embodiments below in combination with drawings in the embodiments of the present invention. Apparently, the described embodiments are merely a part of embodiments of the present invention and are not all the embodiments. On a basis of the embodiments in the present invention, all other embodiments obtained by those skilled in the technical field without creative efforts fall into the scope of protection of the present invention.

It is to be noted that terms "first", "second" and the like in the description, claims and drawings of the present invention are used for distinguishing similar objects and not have to describe a specific sequence or precedence order. It is to be understood that data used in this way can be interchanged under a proper circumstance, facilitating the embodiments of the present invention described herein. In addition, terms "include" and "have" and any deformation thereof are intended to cover non-exclusive inclusions, for example, processes, methods, systems, products or devices including a series of steps or units have not to be limited to clear listing of these steps or units but to include other steps or units that are not listed clearly and other inherent steps or units of these processes, methods, products or devices.

It is to be noted that the terms used herein are merely to describe specific implementation modes rather than being intended to limit the exemplary implementation modes according to the application. As used herein, unless otherwise specified in the context, the singular form is further intended to include plural form. In addition, it is to be further understood that when the terms "comprise" and/or "include" are used in the description, it indicates that there are features, steps, operations, apparatuses, assemblies and/or their combinations.

Figure 1:
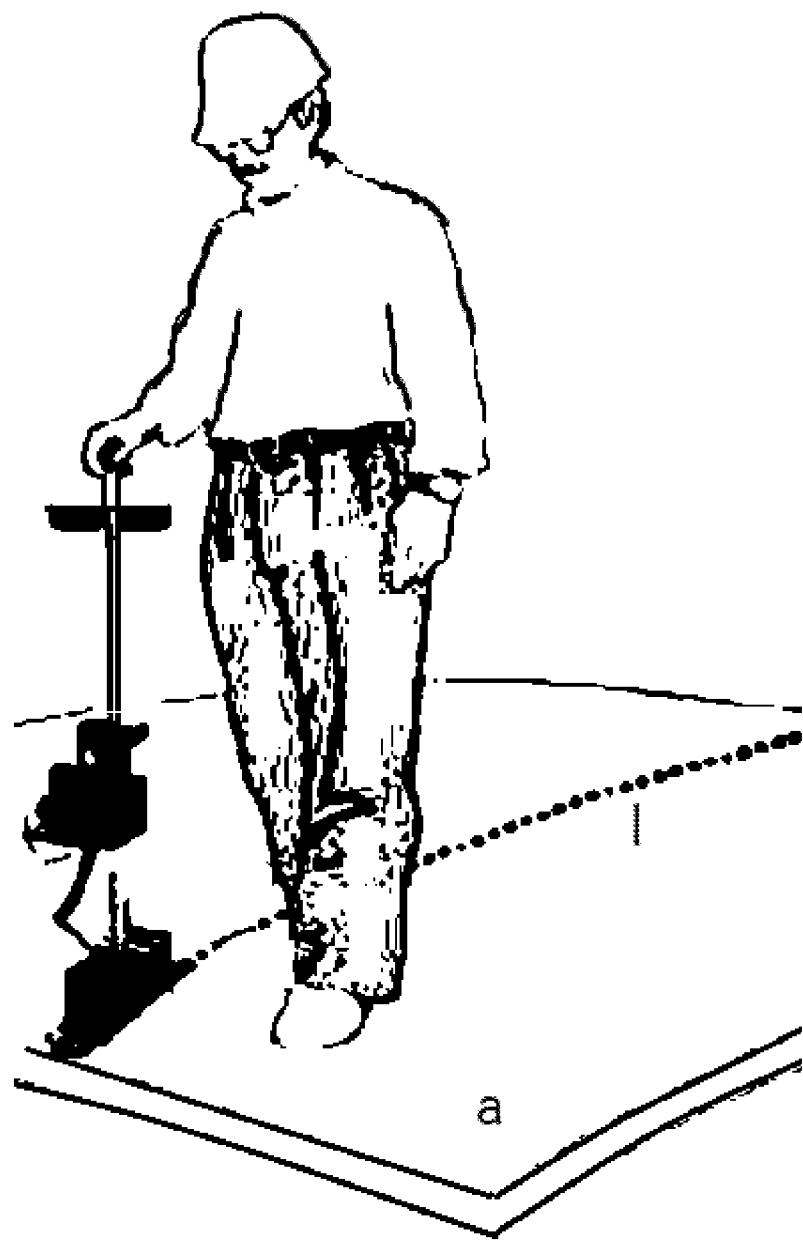
FIG. 1 shows a structure schematic diagram of a terrace detection device during use in the prior art.

As shown in FIG. 1, in the prior art, an operator can hold a measuring device to detect a to-be-measured terrace a, with a measuring mode of acquiring linear data on a line section 1 on the to-be-measured terrace a so as to evaluate the to-be-measured terrace a by means of the linear data. The linear data only evaluates part of quality of the to-be-measured terrace a and cannot evaluate the overall quality of the to-be-measured terrace a. Therefore, terrace data acquired by the measuring mode is still incomprehensive and inaccurate.

Figure 2:
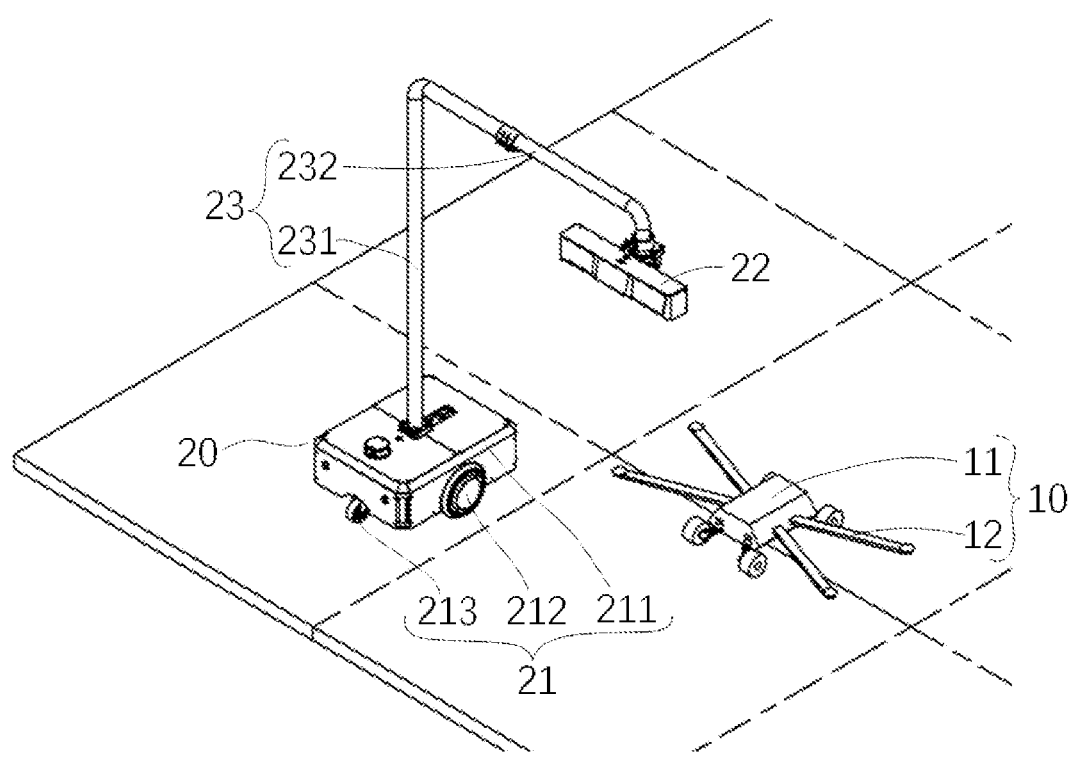
FIG. 2 is a structure schematic diagram according to an embodiment of a terrace detection device of the present invention.

As shown in FIG. 2, in the technical scheme of the present invention, provided is a terrace detection device, the terrace detection device including a target vehicle 10, a measuring vehicle 20 and a controller, wherein the target vehicle 10 includes a first mobile vehicle 11 and a target 12, and the target 12 is mounted on the first mobile vehicle 11; the measuring vehicle 20 includes a second mobile vehicle 21 and a measuring head 22, the measuring head 22 is mounted on the second mobile vehicle 21, and the measuring head 22 is used for acquiring planar point cloud data and target graphic information in an established measuring range; and the controller is electrically connected with the measuring vehicle 20 and the target vehicle 10, respectively, and is used for controlling the first mobile vehicle 11 and the second mobile vehicle 21 to move from a first established measuring range to a second established measuring range, wherein the controller further controls the measuring head 22 to acquire first point cloud data in the first established measuring range and second point cloud data in the second established measuring range as well as first target graphic information in the first established measuring range and second target graphic information in the second established measuring range, and the controller splices the first point cloud data and the second point cloud data together according to the first target graphic information and the second target graphic information.

By applying a technical solution of the present invention, point cloud data that can only be acquired by the measuring vehicle 20 can be spliced together by the cooperation of the target vehicle 10 and the measuring vehicle 20, so that comprehensive data of a to-be-measured terrace is obtained. Therefore, the to-be-measured terrace is estimated integrally, so that the accuracy of the acquired terrace data is improved. Meanwhile, the terrace detection efficiency can further be improved by the cooperation of the target vehicle 10 and the measuring vehicle 20.

Optionally, the second mobile vehicle 21 can either move under control of a remote control or move under guidance of a navigation device mounted thereon. The navigation device capable of being used includes common navigation modes such as laser radar, a visual sensor, a depth camera and magnetic guidance. Optionally, the measuring head 22 acquires a local surface morphology of a terrace by stereoscopic vision, and an implementation mode of stereoscopic vision includes, but not limited to, a monocular/binocular vision method, a laser scanning method, a structured light method and the like.

Optionally, the first mobile vehicle 11 can either move under control of the remote control or be self-navigated following movement of the second mobile vehicle 21. The target 12 is fixed to the first mobile vehicle 11.

As an optional implementation mode, the controller can be mounted on one of the measuring vehicle 20 and the target vehicle 10. As other optional implementation modes, the controller can be mounted on other control terminal devices, to enable the controller to establish communication connections with the measuring vehicle 20 and the target vehicle 10.

As shown in FIG. 1, as an optional implementation mode, the measuring vehicle 20 further includes a bracket 23, the bracket 23 is mounted on the second mobile vehicle 21, and the measuring head 22 is mounted on the bracket 23. As the measuring head 22 is mounted via the bracket 23, an established measuring range of the measuring head 22 can be expanded, thereby obtaining cloud point data in a larger range.

In the technical scheme of the embodiment, more preferably, the bracket 23 includes a vertical frame 231 and a transverse frame 232, the vertical frame 231 is vertically mounted on the second mobile vehicle 21, the transverse frame 232 is transversely disposed on the vertical frame 231, and the measuring head 22 is mounted on the transverse frame 232. The vertical frame 231 can be lifted up to a measuring height of the measuring head 22 and the transverse frame 232 can reduce interference of the second mobile vehicle 21 to the measuring head 22, so that the established measuring range of the measuring head 22 is further expanded, thereby obtaining cloud point data in a larger range.

As an optional implementation mode, as shown in FIG. 1, in the technical scheme of the embodiment, the second mobile vehicle 21 includes: a second vehicle body 211, driving wheels 212 and supporting wheels 213, wherein the driving wheels 212 are mounted on both sides of the second vehicle body 211 and used for driving the second vehicle body 211 to move, and the supporting wheels 213 are mounted on a front side and a rear side of the second vehicle body 211 and used for supporting the second vehicle body 211. The measuring head 22 is lifted up through the bracket 23, so that the global center of the measuring vehicle 20 is high. Supported by the supporting wheels 213, the measuring vehicle 20 operates more stably.

As an optional implementation mode, in the technical scheme of the embodiment, the target 12 is a geometrical identification member or a non-geometrical identification member mounted on the first mobile vehicle 11. The shape of the target 12 capable of being differentiated from possible conventional shapes on the terrace is preferred. Specifically, in the technical scheme of the embodiment, the target 12 is an X-shaped member mounted on the mobile vehicle 11. Actually, a two-dimensional graph or a three-dimensional body with a specific shape can be used as the target. In practice, the target can be either a paste mark point or some printed special patterns. Theoretically, the longer the distance between feature points of the target is, the more precise the rectification is. There is a balance between the size of the target and the rectification precision.

Figure 3:
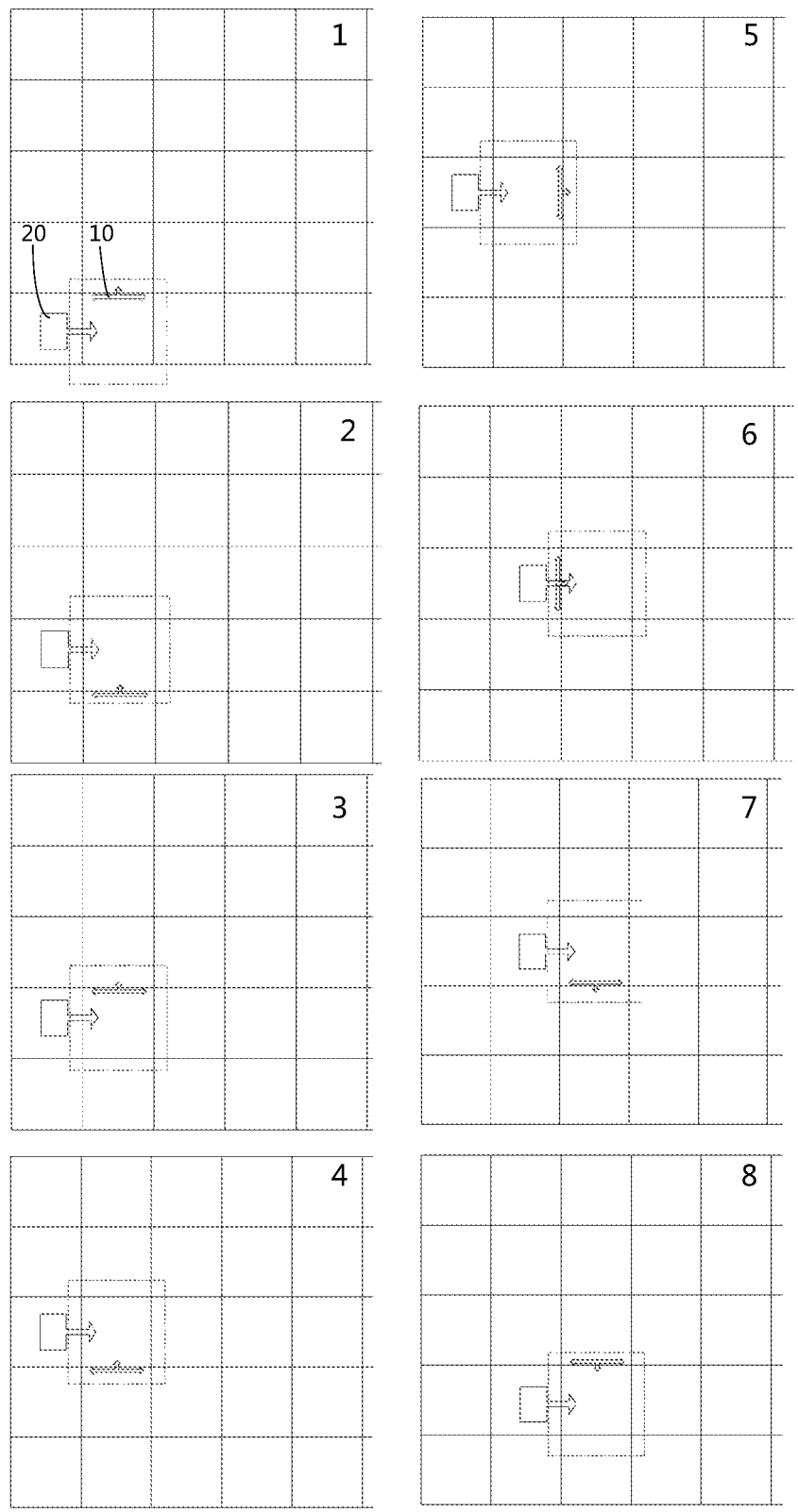
FIG. 3 shows a diagram of a use method of a terrace detection device according to the present invention.
Figure 4:
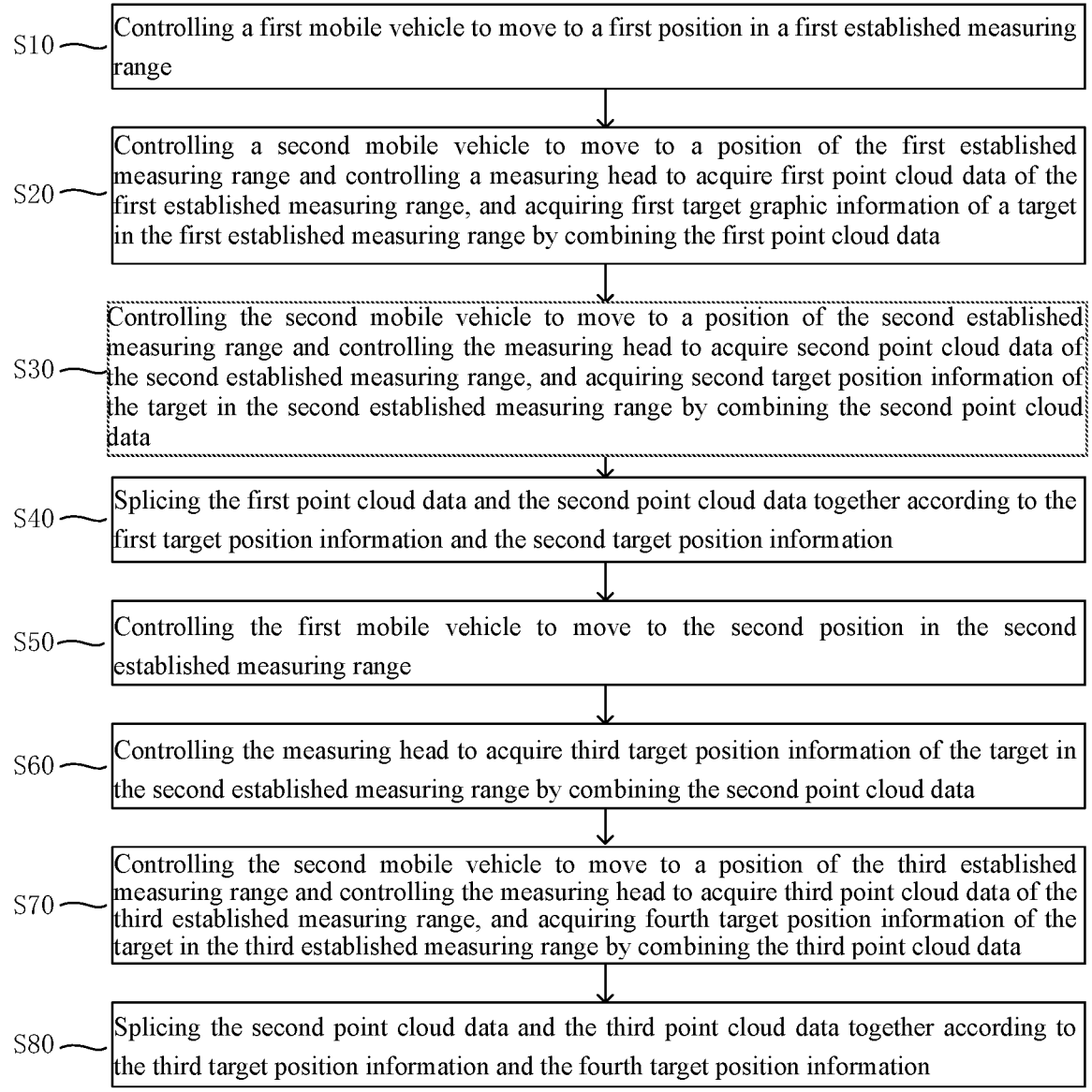
FIG. 4 shows a flow diagram of a use method of a terrace detection device according to the present invention.

As shown in FIG. 3 and FIG. 4, the present invention further provides a use method of a terrace detection device, the use method being used for controlling the terrace detection device, the use method including:

S10: a first mobile vehicle 11 is controlled to move to a first position in a first established measuring range;

S20: a second mobile vehicle 21 is controlled to move to a position of the first established measuring range and a measuring head 22 is controlled to acquire first point cloud data of the first established measuring range, and first target graphic information of a target 12 in the first established measuring range is acquired by combining the first point cloud data;

S30: the second mobile vehicle 21 is controlled to move to a position of the second established measuring range and the measuring head 22 is controlled to acquire second point cloud data of the second established measuring range, and second target graphic information of the target 12 in the second established measuring range is acquired by combining the second point cloud data; and S40: the first point cloud data and the second point cloud data are spliced together according to the first target graphic information and the second target graphic information.

By applying the technical scheme of the present invention, as shown in S1 and S2 in FIG. 3, a to-be-detected terrace can be divided into a plurality of established measuring ranges that are connected; point cloud data is acquired for two adjacent established measuring ranges successively by means of the above-mentioned use method; and then the point cloud data of the plurality of established measuring ranges is spliced together by combining the target graphic information with the point cloud data so as to obtain acquire integral point cloud data of the to-be-detected terrace, so that integral surface morphology data of the to-be-detected terrace can be generated, and therefore, it is convenient to evaluate the overall quality of the to-be-detected terrace.

Optionally, for a control mode of matched measurement by the target vehicle 10 and the measuring vehicle 20, a measuring process can be completed by way of remote control or autonomous driving, with automatically generated calculating result and report form.

As shown in FIG. 3 and FIG. 4, as an optional implementation mode, in the technical scheme of the embodiment, more preferably, in S40, the first point cloud data and the second point cloud data are spliced together by superposing the first target graphic information and the second target graphic information. As a result of the same target 12, the position of the target 12 is the boundary where the first point cloud data and the second point cloud data are spliced. Therefore, it is only needed to superpose the first target graphic information with the second target graphic information.

As shown in FIG. 3 and FIG. 4, as an optional implementation mode, in the technical scheme of the embodiment, more preferably, the first target graphic information is first boundary position information of the first established measuring range, and the second target graphic information is second boundary position information of the second established measuring range. Thus, there are few repeated data of the first point cloud data and the second point cloud data to be eliminated, and it is only needed to splice the boundaries of the first point cloud data and the second point cloud data directly.

As shown in FIG. 3 and FIG. 4, as an optional implementation mode, in the technical scheme of the embodiment, more preferably, the use method further includes:

S50: the first mobile vehicle 11 is controlled to move to the second position in the second established measuring range;

S60: the measuring head 22 is controlled to acquire third target graphic information of the target 12 in the second established measuring range by combining the second point cloud data;

S70: the second mobile vehicle 21 is controlled to move to a position of the third established measuring range and the measuring head 22 is controlled to acquire third point cloud data of the third established measuring range, and fourth target graphic information of the target 12 in the third established measuring range is acquired by combining the third point cloud data; and S80: the second point cloud data and the third point cloud data are spliced together according to the third target graphic information and the fourth target graphic information.

As shown in S3 and S4 in FIG. 3, before the second point cloud data of the second established measuring range and the third point cloud data of the third established measuring range are spliced, it is needed to first move the target 12 to a position where the second established measuring range and the third established measuring range are associated. Then, the second point cloud data and the third target graphic information are combined, and the third point cloud data and the fourth target graphic information are combined, so that the second point cloud data and the third point cloud data are spliced together.

As shown in FIG. 3 and FIG. 4, as an optional implementation mode, in the technical scheme of the embodiment, more preferably, in S80, the second point cloud data and the third point cloud data are spliced together by superposing the third target graphic information and the fourth target graphic information. In a similar way, as a result of the same target 12, the position of the target 12 is the boundary where the first point cloud data and the second point cloud data are spliced. Therefore, it is only needed to superpose the first target graphic information with the second target graphic information.

As shown in S5 and S6 in FIG. 3, the splicing mode of the point cloud data of the two established measuring ranges in a same row is identical to that in S10-S40. In S5 and S6, the target vehicle 10 just operates between the two adjacent established measuring ranges in the same row. As shown in S7 and S8 in FIG. 3, the continuous splicing mode of the point cloud data of the two established measuring ranges in a same column is identical to that in S10-S40. In S7 and S8, the target vehicle 10 just operates downwards between the two adjacent established measuring ranges in the same column.

Optionally, the measuring mode of the measuring head 22 is a stereoscopic vision-based non-contact measuring mode which features high measuring precision, small influence by environment and ground material and full-automatic acquisition and processing of data.

Specifically, the measuring method consists of remote control measurement and automatic measurement.

Remote control measurement means that an operator completes a measuring plan of the plurality of established measuring ranges autonomously, and measures the point cloud data of each established measuring range by remotely controlling the target vehicle 10 and triggering the measuring action of the measuring vehicle 20 to splice the point cloud data of the plurality of established measuring ranges to obtain the overall point cloud data of the to-be-detected terrace so as to generate integrated surface morphology data of the to-be-detected terrace, so that it is convenient to evaluate the overall quality of the to-be-detected terrace.

Automatic measurement means that the operator presets measuring parameters of the to-be-detected terrace, and the controller automatically generates the measuring plan of the plurality of established measuring ranges, performs measuring initialization and control of the target vehicle 10 and the measuring vehicle 20 in the measuring process of each established measuring range successively according to the measuring plan, and finally, integral surface morphology data of the to-be-detected terrace is generated.

A single measuring scene of the technical scheme demonstrated by the present invention is decided by system parameters. In order to guarantee the measuring precision of the terrace, the single measuring scene is usually smaller than a to-be-measured terrace range, so that it is needed to perform measuring planning of the plurality of established measuring ranges according to the single measuring scene and the to-be-measured terrace range. The measuring results are spliced after the plurality of established measuring ranges are measured, and finally, integral surface morphology data of the to-be-detected terrace is generated.

A theory of splicing adjacent measuring data is as follows: special marks are arranged near the boundary of the two adjacent established measuring ranges, so that three-dimensional point cloud data of the two adjacent established measuring ranges respectively acquired by the stereoscopic vision sensor includes contours of the marks.

By adopting a pose transformation algorithm, the point cloud data in two subareas are merged after the contours of the marks in the cloud point data of the two adjacent established measuring ranges are aligned, namely, the measuring data in adjacent subareas is spliced. By parity of reasoning, the measuring data of every adjacent scenes is spliced successively to obtain the integral measuring data of the whole site.

It can be known from the splicing theory of the measuring data that the measuring scenes of the two adjacent established measuring ranges shall be partially overlapped, and the size of the overlapped area is jointly decided by factors such as a stereoscopic vision implementation mode, the measuring head 22 and the requirement on the measuring precision of the terrace. By taking a 3 m*3 m to-be-measured terrace as an example, it is assumed that each established measuring range is 1.2 m*1.2 m, the size of the overlapped area of the two adjacent established measuring ranges is minimally 0.2 m*0.2 m, so that the quantity of the established measuring ranges shall not smaller than 9, and a point location planning mode includes, but not limited to, the description.

At the same time, in the present invention, the marks needed to splice the two adjacent established measuring ranges are implemented by the target 12, and the target 12 is carried by the first mobile vehicle 11 to travel to the boundary of each established measuring range.

It can be known from the above-mentioned content that in the technical scheme of the present invention, the obtained measuring data is integral three-dimensional configuration of the whole ground, which can not only be directly used for evaluating the ground quality, but also be used for extracting two-dimensional and one-dimensional information therefrom so as to obtain a result consistent with that of a current measuring tool. Moreover, by the cooperation of the target vehicle 10 with the measuring vehicle 20, multiple measurements and data splicing of a continuous ground can be completed automatically without manually holding the tool to perform repeated operations many times. Compared with current measuring means, in the whole process, the labor intensity of the operator is remarkably alleviated, influence to the measuring result by manual factors is reduced, the measuring process is rapid and efficient, and the data is reliable. Meanwhile, according to the technical scheme of the present invention, integral data of surface topography of the terrace can be obtained quickly, so that problems of information loss, poor reproductivity, difficulty to position defect points and the like as high-dimensional substances are replaced with low-dimensional substances in the current measuring means are solved. It can not only lay a foundation for a more scientific and accurate terrace quality evaluation standard, but also provide clear guidance for subsequent maintenance and renovation.

Unless otherwise specified, relative arrangement, digital expression formulae and numerical values of components and steps illustrated in these embodiments do not limit the scope of the present invention. Meanwhile, it shall be understood that for the convenience of description, sizes of parts shown in the drawings are not drawn according to an actual proportional relationship. Techniques, methods and devices known to those skilled in the prior art cannot be discussed in detail. But in a proper circumstance, the techniques, methods and devices shall be regarded as a part of the description. In all the illustrated and discussed examples, any specific value shall be explained as be exemplary merely rather than be restrictive. Thus, other examples of exemplary embodiments can have different values. It is to be noted that similar mark numbers and letters represent similar items in the drawings below, such that once a certain item is defined in a drawing, it is unnecessary to further discuss it in the subsequent drawings.

For the convenience of description, spatial relative terms such as "over", "above", "on the upper surface of" and "upper" can be used here to describe spatial position relations of one device or feature or other devices or features shown in the drawings. It is to be understood that spatial relative terms are intended to include different orientations in use and operation except orientations of the device described in the drawings. For example, if the device in the drawings is inverted, it is positioned "below other devices or structures" or "under other devices or structures" after being described as a device "above other devices or structures" or "over other devices or structures". Therefore, the exemplary term "above" can include two orientations: "above" and "below". The device can be positioned in other different ways (rotated at 90 degrees or located in other orientations), and corresponding explanation is made on relative spatial description used here.

It is to be understood that in the description of the present invention, orientation or position relations indicated by nouns of locality such as "front", "back", "upper". "lower", "left", "right", "transverse, vertical, perpendicular and horizontal" and "top and bottom" are orientation or position relations based on the drawings and are only used for convenient description of the present invention and simplification of the description rather than indicates or implies that the indicated devices or components must have specific orientations and are configured and operated in the specific orientations without making reverse description. Therefore, it cannot be construed as limitations to the present invention. Nouns of locality "inner and outer" refer to inside and outside of the contour of each component itself.

The above is merely preferred embodiments of the present invention and is not used to limit the present invention. For those skilled in the art, various alternations and changes can be made on the present invention. Any modification, equivalent replacement, improvement, etc. made within the spirit and principle of the present invention shall be regarded as within the protection scope of the present invention.

What is claimed:

1. A terrace detection device, comprising:
   a target vehicle (10), the target vehicle (10) comprising:
      a first mobile vehicle (11) that can either move under control of a remote control or be self-navigated following movement of a second mobile vehicle (21);
      a X-shaped target (12) mounted on the first mobile vehicle (11);
   a measuring vehicle (20), the measuring vehicle (20) comprising:
      the second mobile vehicle (21) comprising:
         a navigation device mounted thereon with a laser radar, a visual sensor, a depth camera and a magnetic guidance;
      a measuring head (22) mounted on the second mobile vehicle (21), the measuring head (22) being used for acquiring planar point cloud data and target graphic information in an established measuring range via stereoscopic vision and an implementation mode of stereoscopic vision, including a monocular/binocular vision method, a laser scanning method, and a structured light method; and
   a controller electrically connected with the measuring vehicle (20) and the target vehicle (10), respectively, and used for controlling the first mobile vehicle (11) and the second mobile vehicle (21) to move from a first established measuring range to a second established measuring range, wherein the controller further controls the measuring head (22) to acquire first point cloud data in the first established measuring range and second point cloud data in the second established measuring range as well as first target graphic information in the first established measuring range and second target graphic information in the second established measuring range, and the controller splices the first point cloud data and the second point cloud data together according to the first target graphic information and the second target graphic information.

2. The terrace detection device according to claim 1, wherein the measuring vehicle (20) further comprises a bracket (23), the bracket (23) is mounted on the second mobile vehicle (21), and the measuring head (22) is mounted on the bracket (23).

3. The terrace detection device according to claim 2, wherein the bracket (23) comprises a vertical frame (231) and a transverse frame (232), the vertical frame (231) is vertically mounted on the second mobile vehicle (21), the transverse frame (232) is transversely disposed on the vertical frame (231), and the measuring head (22) is mounted on the transverse frame (232).

4. The terrace detection device according to claim 2, wherein the second mobile vehicle (21) comprises:
   a second vehicle body (211);
   driving wheels (212) mounted on both sides of the second vehicle body (211) and used for driving the second vehicle body (211) to move; and
   a supporting wheel (213) mounted on a front side and/or a rear side of the second vehicle body (211) and used for supporting the second vehicle body (211).

5. The terrace detection device according to claim 1, wherein the X-shaped target (12) is a geometrical identification member or a non-geometrical identification member mounted on the first mobile vehicle (11).

6. A use method of a terrace detection device, the use method being used for controlling the terrace detection device, the use method comprising:
   S10: controlling a first mobile vehicle (11) to move, via a remote control or be self-navigated following movement of a second mobile vehicle (21), to a first position in a first established measuring range;
   S20: controlling the second mobile vehicle (21), comprising a navigation device mounted thereon with a laser radar, a visual sensor, a depth camera and a magnetic guidance, to move to a position of the first established measuring range and controlling a measuring head (22) to acquire first point cloud data of the first established measuring range via stereoscopic vision and acquiring first target graphic information of a X-shaped target (12) in the first established measuring range by combining the first point cloud data;
   S30: controlling the second mobile vehicle (21) to move to a position of the second established measuring range and controlling the measuring head (22) to acquire second point cloud data of the second established measuring range via stereoscopic vision, and acquiring second target graphic information of the X-shaped target (12) in the second established measuring range by combining the second point cloud data; and
   S40: splicing the first point cloud data and the second point cloud data together according to the first target graphic information and the second target graphic information.

7. The use method according to claim 6, wherein in S40, the first point cloud data and the second point cloud data are spliced together by superposing the first target graphic information and the second target graphic information.

8. The use method according to claim 7, wherein the first target graphic information is first boundary position information of the first established measuring range, and the second target graphic information is second boundary position information of the second established measuring range.

9. The use method according to claim 6, further comprising:
   S50: controlling the first mobile vehicle (11) to move to the second position in the second established measuring range;
   S60: controlling the measuring head (22) to acquire third target graphic information of the X-shaped target (12) in the second established measuring range by combining the second point cloud data;
   S70: controlling the second mobile vehicle (21) to move to a position of the third established measuring range and controlling the measuring head (22) to acquire third point cloud data of the third established measuring range, and acquiring fourth target graphic information of the X-shaped target (12) in the third established measuring range by combining the third point cloud data; and S80: splicing the second point cloud data and the third point cloud data together according to the third target graphic information and the fourth target graphic information.

10. The use method according to claim 9, wherein in S80, the second point cloud data and the third point cloud data are spliced together by superposing the third target graphic information and the fourth target graphic information.

\* \* \* \* \*